United States Patent
Sherony et al.

(10) Patent No.: US 11,580,870 B2
(45) Date of Patent: Feb. 14, 2023

(54) SYSTEMS AND METHODOLOGIES FOR PROVIDING TRAINING ON WARNINGS IN A VEHICLE

(71) Applicant: TOYOTA MOTOR ENGINEERING & MANUFACTURING NORTH AMERICA, INC., Erlanger, KY (US)

(72) Inventors: Rini Sherony, Ann Arbor, MI (US); Tina Brunetti Sayer, Ann Arbor, MI (US)

(73) Assignee: TOYOTA MOTOR ENGINEERING & MANUFACTURING NORTH AMERICA, INC., Erlanger, KY (US)

(*) Notice: Subject to any disclaimer, the term of this patent is extended or adjusted under 35 U.S.C. 154(b) by 249 days.

(21) Appl. No.: 15/167,265

(22) Filed: May 27, 2016

(65) Prior Publication Data

US 2017/0345328 A1    Nov. 30, 2017

(51) Int. Cl.
| | | |
|---|---|---|
| *G09B 9/05* | (2006.01) | |
| *G09B 5/06* | (2006.01) | |
| *B60K 35/00* | (2006.01) | |
| *B60Q 5/00* | (2006.01) | |
| *G09B 19/16* | (2006.01) | |

(52) U.S. Cl.
CPC ............... *G09B 9/05* (2013.01); *B60K 35/00* (2013.01); *B60Q 5/006* (2013.01); *G09B 5/06* (2013.01); *B60K 2370/161* (2019.05); *B60K 2370/592* (2019.05); *G09B 19/167* (2013.01)

(58) Field of Classification Search
CPC ... G09B 9/05; G09B 5/06; G09B 9/08; B60K 35/00; B60Q 5/006
See application file for complete search history.

(56) References Cited

U.S. PATENT DOCUMENTS

| | | | |
|---|---|---|---|
| 5,009,598 A * | 4/1991 | Bennington | G09B 9/08 244/194 |
| 5,618,179 A | 4/1997 | Copperman et al. | |
| 7,894,951 B2 | 2/2011 | Norris et al. | |
| 8,998,617 B2 | 4/2015 | Kumar | |
| 2010/0070932 A1* | 3/2010 | Hur | G09B 5/06 715/863 |
| 2015/0104757 A1 | 4/2015 | Moncrief et al. | |
| 2016/0163217 A1* | 6/2016 | Harkness | G09B 5/06 434/65 |

FOREIGN PATENT DOCUMENTS

| | | |
|---|---|---|
| DE | 10 2009 045 511 A1 | 4/2011 |
| DE | 10 2011 107 974 A1 | 1/2013 |
| DE | 10 2011 088 768 A1 | 6/2013 |
| JP | 2001092343 * | 4/2001 ............. A63F 13/00 |

* cited by examiner

*Primary Examiner* — Yingchuan Zhang
(74) *Attorney, Agent, or Firm* — Oblon, McClelland, Maier & Neustadt, L.L.P.

(57) ABSTRACT

Methods and systems are provided for providing training on a vehicle. The method includes acquiring, using processing circuitry, one or more alert modes associated with a vehicle. Further, the method includes controlling one or more alert devices as a function of a first alert mode. The first alert mode is selected from the one or more alert modes. The method includes outputting information to a user associated with the first alert mode via one or more output devices.

18 Claims, 8 Drawing Sheets

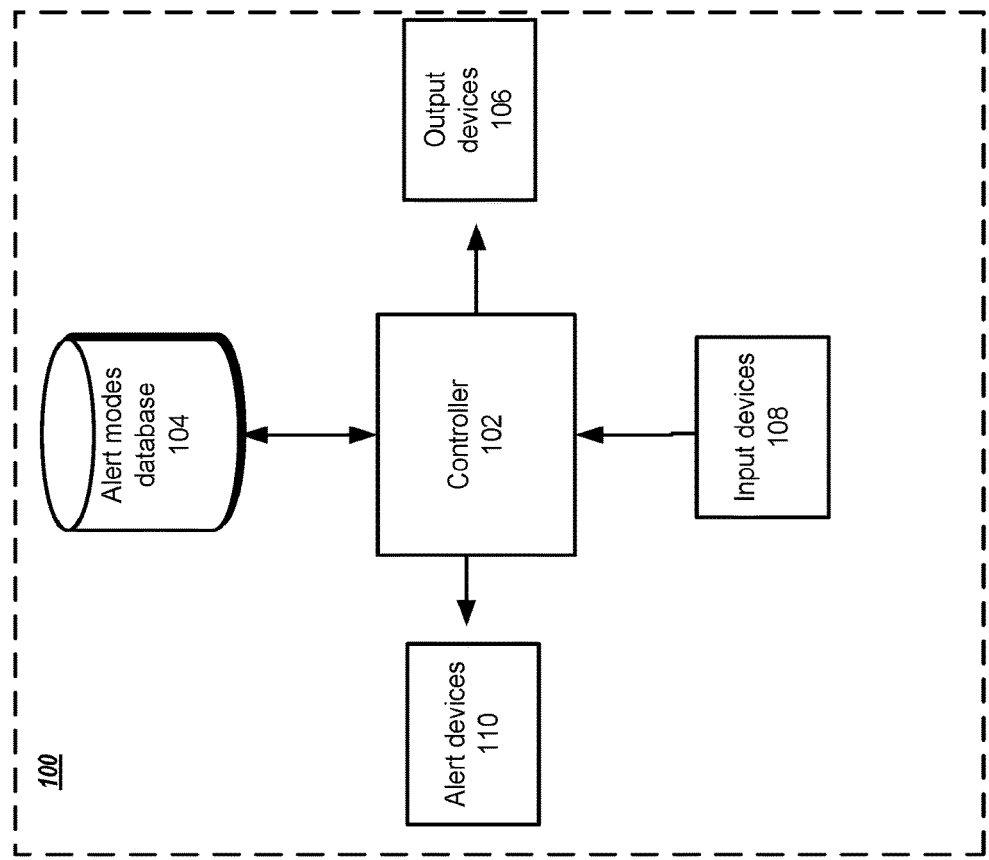
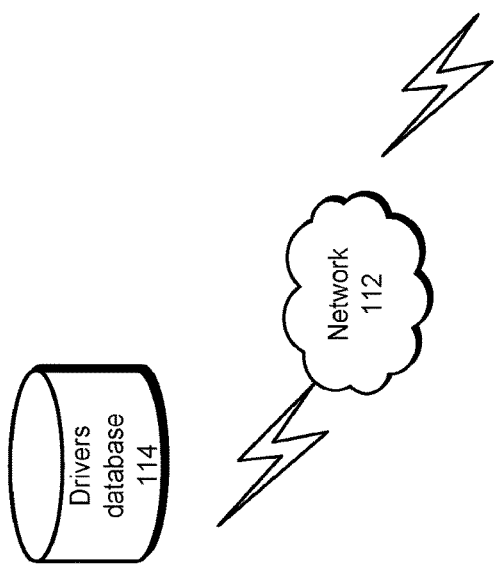
FIG. 1

| Driver A | |
|---|---|
| Car model | Status |
| A | Completed |
| B | Completed |

200

| Driver B | |
|---|---|
| Car model | Status |
| A | Not completed |
| B | Completed |

SYSTEMS AND METHODOLOGIES FOR PROVIDING TRAINING ON WARNINGS IN A VEHICLE

BACKGROUND

Advanced driver assistance systems (ADAS) generate a plurality of alerts to assist a driver in autonomous and/or semiautonomous vehicles. Drivers may be unfamiliar with the plurality of alerts. U.S. Pat. No. 5,618,179 entitled "Driving training system and method with performance data feedback" by Copperman et al. describes a driver training system that simulates a driving environment and provides performance data.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention. The foregoing paragraph has been provided by way of general introduction, and is not intended to limit the scope of the following claims. The described embodiments, together with further advantages, will be best understood by reference to the following detailed description taken in conjunction with the accompanying drawings.

SUMMARY

The present inventors recognized that it would be beneficial if training is provided to familiarize drivers with the plurality of alerts generated by an ADAS.

According to an embodiment of the present disclosure, there is provided a method for providing training on a vehicle. The method includes acquiring, using processing circuitry, one or more alert modes associated with a vehicle. Further, the method includes activating one or more alert devices as a function of a first alert mode. The first alert mode is identified from the one or more alert modes by a user. The method includes outputting, using the processing circuitry, information to a user associated with the first alert mode via one or more output devices.

According to an embodiment of the present disclosure, there is provided a non-transitory computer-readable medium storing instructions which, when executed by at least one processor, cause the at least one processor to perform the above-described method for training on a vehicle.

According to an embodiment of the present disclosure, there is provided a system for training on a vehicle. The system comprises one or more output devices, one or more alert devices, and processing circuitry. The processing circuitry is configured to acquire one or more alert modes associated with a vehicle and control the one or more alert devices as a function of a first alert mode. The first alert mode is selected from the one or more alert modes. The processing circuitry is further configured to output information to a user associated with the first alert mode via the one or more output devices.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 is a block diagram representation of a system for providing training on alerts in a vehicle according to one example;

FIG. 2 shows logs for a plurality of drivers according to one example;

DETAILED DESCRIPTION

Figure 3:
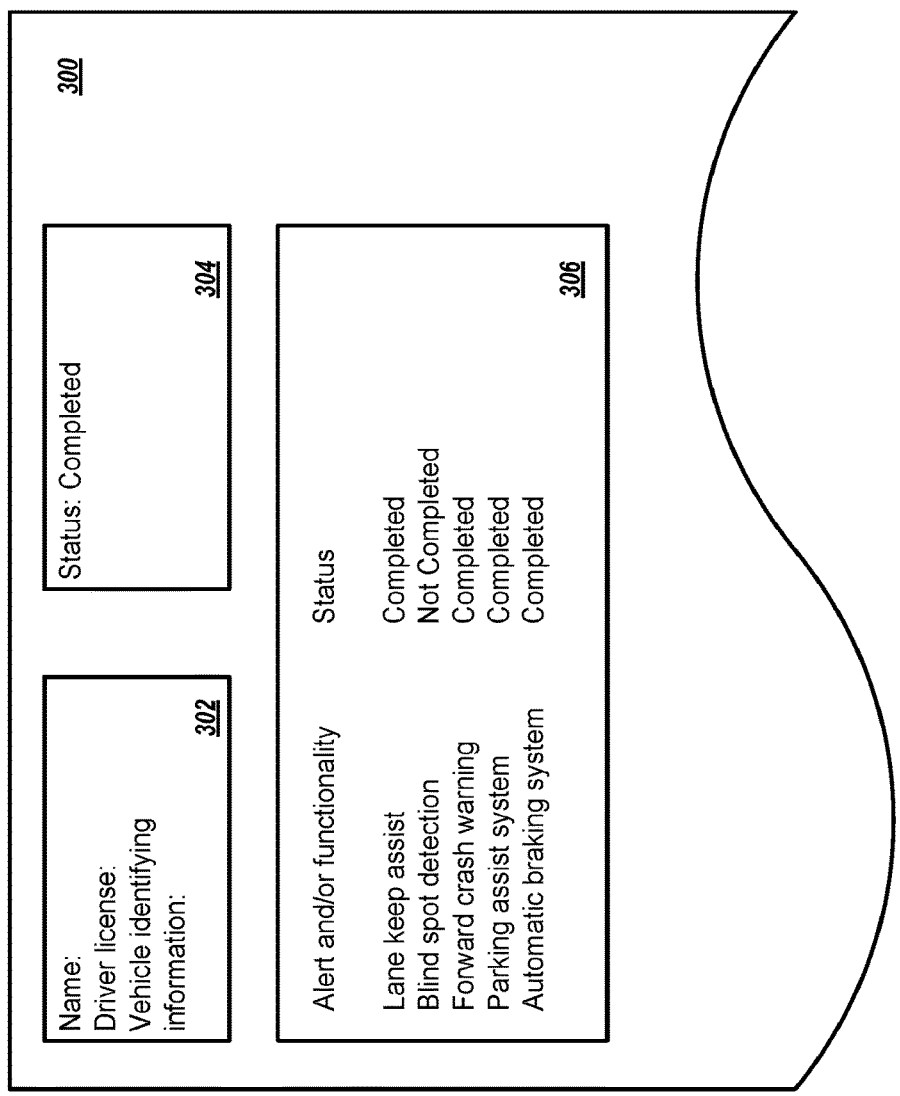
FIG. 3 shows a training record for a driver according to one example.

Referring now to the drawings, wherein like reference numerals designate identical or corresponding parts throughout several views, the following description relates to system and methodologies for providing training on a vehicle.

Further, as used herein, the words "a", "an" and the like generally carry a meaning of "one or more," unless stated otherwise.

Vehicles with at least some ADAS and/or semiautonomous/autonomous functionality have been introduced to the market. Training on these vehicles is minimal. For example, some car manufacturers require the salesman at a dealership to attend a location (e.g., training centers) to train on specific features of a vehicle. However, consumers, the people who will actually be driving the vehicle, are not provided with any formal training beyond what is conveyed to them by the salesman.

The system and associated methodology provide training for users on warnings that may be issued in a semiautonomous/autonomous vehicle or one equipped with ADAS. The system generates a plurality of alerts and provides the user with information associated with each alert. The information includes an explanation about the reason that may trigger the warning/auto braking/auto steering functionality (collectively referred to herein as alerts). That way, drivers become more familiar with their vehicle's systems and will become more accustomed to the warnings/auto-braking/auto steering when driving.

The plurality of alerts and warnings may be generated in the ADAS and/or semiautonomous/autonomous vehicle. The plurality of alerts may include one or more haptic alerts, one or more auditory alerts, and/or one or more visual alerts.

In addition, each alert may have different features settings associated with a plurality of alerts modes. For example, an intensity of vibration, a duration of the vibration, a rate of the vibration, and/or frequency of the vibration, an occurrence of the auditory alert, a sound level, a sound type (e.g., particular narrow-band chime, broadband auditory warning signal), a duration of the auditory alert, visual type of the visual alert (e.g., a particular color, symbol), a duration of the visual alert may be associated with different alerts. For example, a lower sound level may be associated with a low priority alert while a higher sound level may be associated with an imminent warning that requires an immediate action from the driver.

The information can be provided in various forms. For example, the information can be audible or visual. The information can be provided in the form of videos. For example, exemplary video footages may be displayed to the user that shows actual situations that may trigger each of the plurality of alerts.

Figure 7:
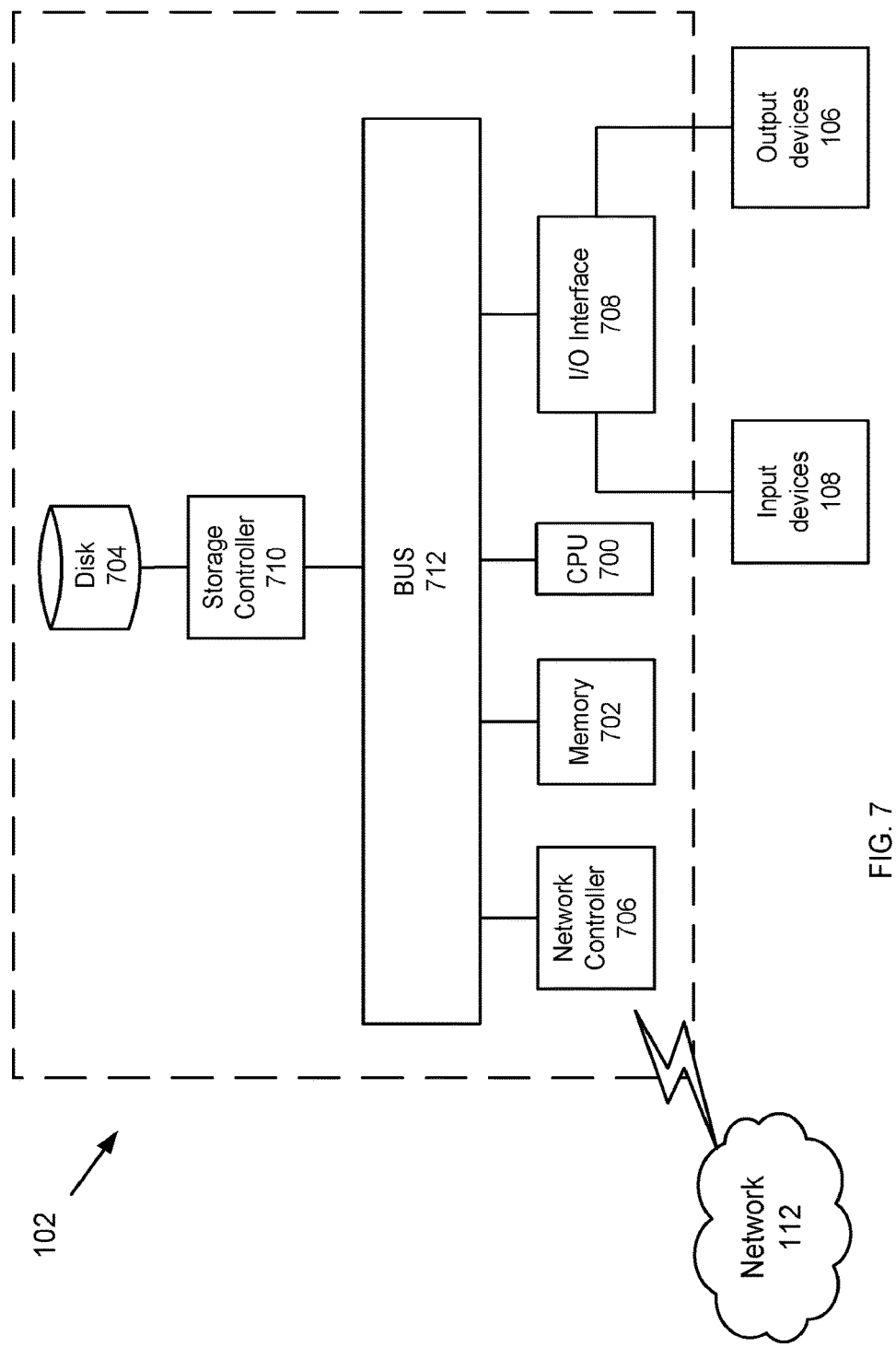
FIG. 7 is an exemplary block diagram of a controller according to one example.

FIG. 1 is a schematic diagram of a system for providing training on a vehicle according to one example. The system 100 may include a controller 102, an alert modes database 104, output devices 106, input devices 106, and alert devices 110. The system 100 may connect to a drivers database 114 via a network 112. The vehicle may be a car, a bus, a truck, or similar vehicle having semi or fully autonomous driving capabilities. In one embodiment, the controller 102 includes a CPU 700 and a memory 702, as shown in FIG. 7.

The controller 102 generates a control signal to the alert devices 110 and outputs information via the output devices 106. For example, for training on lane veering, the controller 102 may send a control signal to the steering wheel to vibrate. In addition, the controller 102 sends information including an explanation about why the steering wheel is vibrating to the output devices 106. While the steering wheel is vibrating, "The steering wheel vibration indicates that the driver is steering from the lane of travel" may be outputted via a loudspeaker.

The alert modes database 104 stores a plurality of alerts that may be generated in the vehicle. The alert modes database 104 stores information associated with each of the plurality of alerts. The alert modes database 104 can include volatile memory, non-volatile memory, or a combination of volatile and non-volatile memory. In one example, the alert modes database 104 may be in the vehicle, in a plug-in vehicle accessory device, in user removable storage (e.g., USB flash drive, Secure Digital SD, etc.), in the memory of a user device (e.g., user smart phone or key fob), or in a cloud database.

The alerts and warnings included in the training represents alerts and warning that may be generated from advanced driver assistance systems (ADAS). The ADAS may include a lane keep assist and warning system, a blind spot detection system, a forward crash warning system, a parking assist system, an automatic braking system, a lane change assist system, a rear cross traffic alert, a pedestrian detection system, an animal detection system, a bicyclist detection system, and a driver attention system.

In one example, alerts may be generated from one or more semiautonomous/autonomous driving systems. The one or more semiautonomous/autonomous driving systems may include self-parking systems, semiautonomous/autonomous steering systems, and the like. Alerts from the one or more semiautonomous/autonomous driving systems may indicate that a human intervention is required. The alerts may have different levels. For example, a last level may indicate that human intervention is needed immediately (imminent) such as when a malfunction is detected in one or more semiautonomous/autonomous systems. Thus, the driver is trained on the plurality of alerts that may be triggered in the vehicle.

In one example, the user may select preferable settings during the training for the training only. The settings may include an output type (e.g., audio, video), a preferable volume level, voice settings (e.g., female voice, male voice), and the like. The settings may also include the language. In other examples, the language may be automatically determined as a function of the location of the vehicle. The location of the vehicle may be determined using localization circuitry such as GPS (Global Positioning System) or other localization methods as would be understood by one of ordinary skill in the art.

Figure 4:
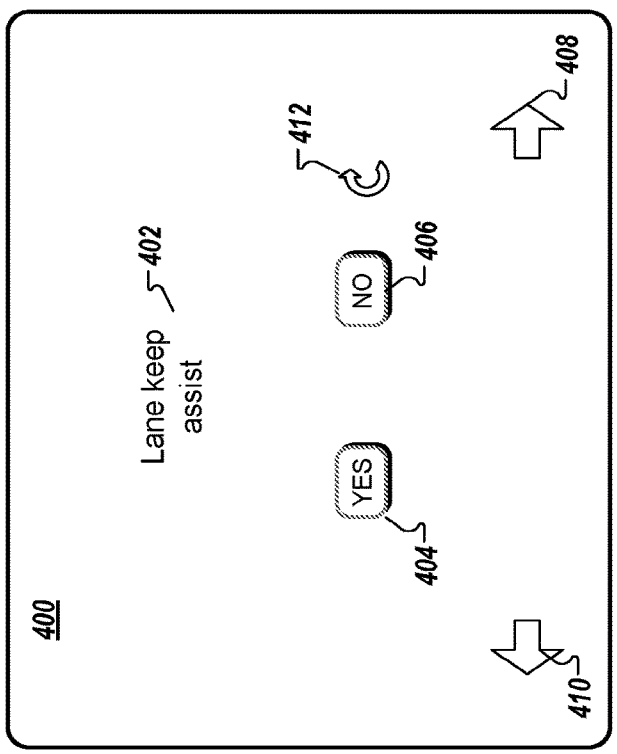
FIG. 4 shows a graphical user interface according to one example.

Once an alert is generated and the information is outputted, the driver may be presented with a user interface to indicate whether the alert and associated information was apprehended. An exemplary user interface is shown in FIG. 4. In one example, each alert is generated a predefined number of times before the driver is presented with the user interface to indicate whether the alert and associated information is apprehended by the user.

The output devices 106 may include a head up display and a multimedia head unit. The head up display may be a micro display imaging technologies including liquid crystal display (LCD), liquid crystal on silicon (LCoS), digital micromirrors (DMD), and organic light-emitting diode (OLED). The multimedia head unit may be located in the center of a dashboard of the vehicle. The multimedia head unit controls one or more loudspeakers that are distributed in the vehicle.

The input devices 108 may include a multiple touch input device and a voice recognition system. The multiple touch input device may be a touchscreen including a touch sensitive surface or a display overlaid with the touch sensitive surface such as a multi-touch input surface (MTIS). Multiple technologies exist for detecting a user's touch using a touch sensitive surface including capacitive technologies, resistive technologies, optical technologies, wave technologies, or other technologies as would be understood by one of ordinary skill in the art.

The voice recognition system may include one or more microphones and processing circuitry configured to detect a user input and map the user input to command to the controller 102 as would be recognized by one of ordinary skill in the art.

The alert devices 110 may include, but are not limited to, haptic alert devices (e.g., steering wheel, vehicle seat, one or more pedals), visual alert devices (e.g., warning lamps, an information center, a screen of an infotainment system, a LED panel, a head-up display, a display reflected off windshield), and auditory alert devices (e.g., warning chimes or beeps). In one example, the alert devices 110 receives signal from ADAS such that a driver can be alerted of various conditions of the vehicle to minimize or prevent collisions. As described further below, the controller 102 sends signals to the alert devices 110 when in a training mode to simulate the plurality of alert modes that may occur while driving.

The network 112 is any network that allows the system 100 and the drivers database 114 to communicate information with each other. Suitable networks can include or interface with any one or more of a local intranet, a PAN (Personal Area Network), a LAN (Local Area Network), a WAN (Wide Area Network), a MAN (Metropolitan Area Network), a VPN (Virtual Private Network), or a SAN (storage area network). Furthermore, communications may also include links to any of a variety of wireless networks, including WAP (Wireless Application Protocol), GPRS (General Packet Radio Service), GSM (Global system for Mobile Communication), CDMA (Code Division Multiple Access) or TDMA (Time Division Multiple Access), cellular phone networks, GPS (Global Positioning System), CDPD (Cellular digit packet data), Bluetooth radio, or an IEEE 802.11 based radio frequency.

The drivers database 114 may be cloud-based databases accessed by the CPU 700 via the network 112. The drivers database 114 stores training status for one or more drivers.

FIG. 2 shows logs for a plurality of drivers according to one example. Tables 200, 202 show training status for two drivers on one or more vehicles. The log may include a vehicle make and model and a training status. For example, a training status of "completed" may indicate that a driver has completed the training for a specific vehicle and model. The logs may be stored in the drivers database 114. In one example, the drivers database 114 may be accessed by a third party to check whether a driver has completed the training on a specific vehicle. For example, a driver may have to complete the training on a specific vehicle before being able to register the vehicle. In one example, a car rental company may connect to the drivers database 114 to check whether a customer has completed the training on a specific vehicle before being able to rent the specific vehicle.

FIG. 3 shows a training record 300 for a driver on a vehicle according to one example. The training record 300 may include a plurality of fields. A first field 302 may include driver identification information. The identification information may include a name, a driver license identifier, and vehicle identifying information (e.g., make, model, year). A second field 304 may shows the status of the training. A third field 306 may include a list of the one or more alerts that may be generated in the vehicle. Each of the one or more alerts may have a status. When the status of all the alerts is marked as completed, the status in the second field 304 is updated to "completed".

FIG. 4 shows a graphical user interface (GUI) 400 according to one example. The GUI 400 may be configured to allow the user to interact with the controller 102. The GUI 400 may include an "ALERT" pane 402, a "YES" control 404, a "NO" control 406, a "NEXT" navigational control 408, a "PREVIOUS" navigational control 410, and a "REPLAY" control 412. The "ALERT" pane 402 presents the user with a name of the alert that was/is generated by the controller 102. The "NEXT" navigational control 408, when selected, presents the user with a new alert. The "PREVIOUS" navigational control 410, when selected, presents the user with the previous alert. Upon activation of the "REPLAY" control 412, the alert is repeated by the controller 102. Thus, the controller 102 sends to the alert devices 110 a signal indicating the alert that the user requests to be repeated. Upon activation of the "YES" control 404, the controller 102 updates the status of the alert mode to "completed". For example, the status of the alert in the training record 300 is updated. Upon activation of the "NO" control 406, the controller 102 may present the user with a new alert or repeat the current alert. In addition, the GUI 400 may include a "select alert" control (not shown). Upon activation of the "select alert" control, the user may be presented with a drop-down menu, search box, or other selection control for identifying the alert that the user requests to be generated.

Figure 5:
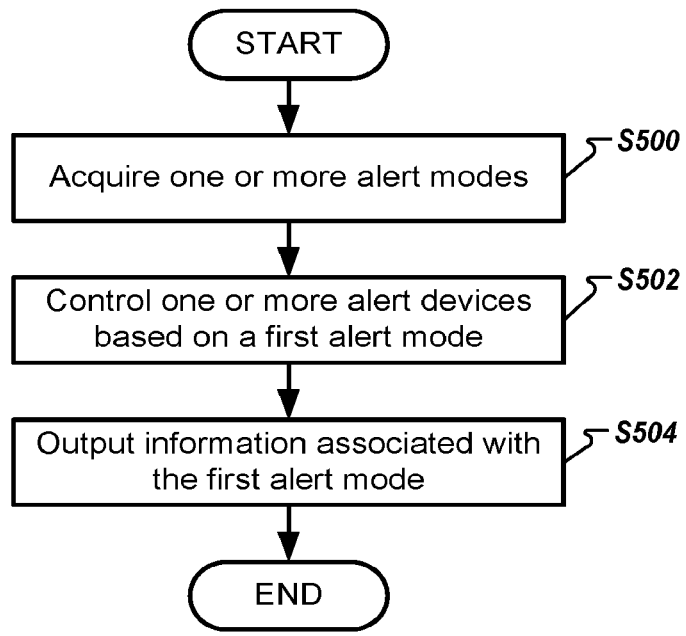
FIG. 5 is a flow chart illustrating a method for providing training on a vehicle according to one example.

FIG. 5 is a flow chart illustrating a method for providing training on a vehicle according to one example. At step S500, the controller 102 may acquire one or more alert modes associated with a vehicle. For example, the one or more modes may be stored in the memory 702 and/or the alert modes database 104. At step S502, the controller 102 may send a signal to one or more alert devices to generate a first alert associated with a first alert mode. The first alert mode is selected from the one or more alert modes. The first alert mode may be selected randomly, by the user, or by a trainer.

At step S504, the information associated with the first alert mode is retrieved and the information is outputted to the user.

Figure 6:
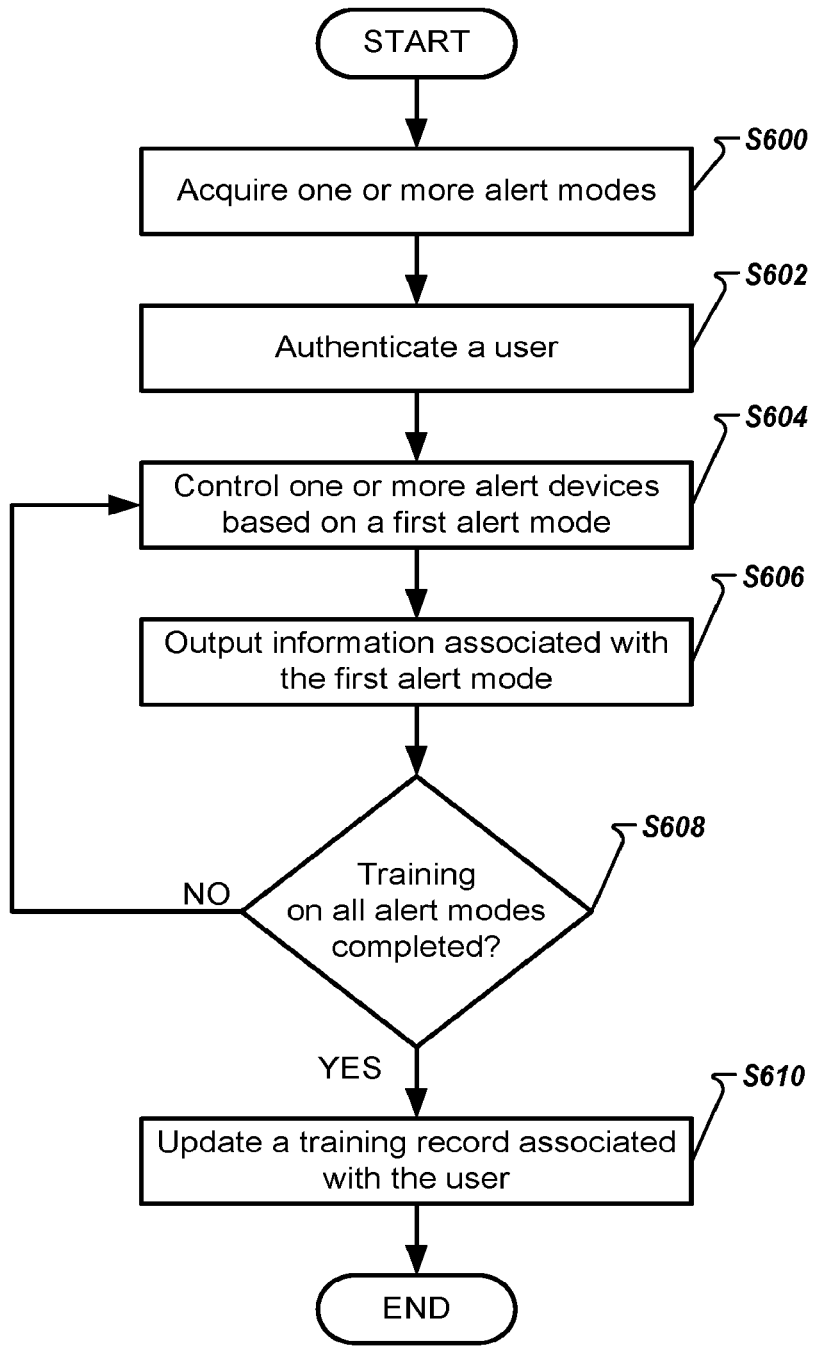
FIG. 6 is a flow chart illustrating a method for providing training on a vehicle according to one example.

FIG. 6 is a flow chart illustrating a method for providing training on a vehicle according to one example. At step S600, the controller 102 may acquire one or more alert modes associated with a vehicle. At step S602, the user may be authenticated. For example, the user may be identified by entering a code or a password. At step S604, the driver may be presented with the GUI 400 to select an alert mode. In one example, the alert mode is selected randomly from the one or more alert modes. The controller 102 selects an alert mode from the one or more alert modes with a "not completed" status. Then, the controller 102 may send a signal to one or more alert devices to generate an alert associated with the selected alert mode. Once an alert mode is selected, the controller 102 may update a count associated with the alert mode. Thus, each alert mode may have an associated count. In addition, a predetermined number may be associated with each alert mode. The predetermined number indicates the number of times an alert mode is to be generated to the user before the training for the alert mode is completed. In one example, the training for the alert mode is not completed until the controller 102 receives an indication from the user that the alert mode is apprehended. At step S606, the controller 102 may output the information associated with the selected alert via the output devices 106. The settings of the output devices 106 may be based on the user identity.

Then, at step S608, the controller 102 may check to see whether all the alert modes are marked as completed. In response to determining that all the alert modes are completed the process goes to step S610. In response to determining that all the alert modes are not completed, the flow goes to step S604. At step S610, the controller 102 may update the training record 300 to "completed". In addition, the user log in the drivers database 114 may be updated. In addition, the status of the training may be sent to an external device via the network 112. In one example, the external device may be a server located in a government facility such as department of motor vehicles.

Next, a hardware description of the controller 102 according to exemplary embodiments is described with reference to FIG. 7. In FIG. 7, the controller 102 includes a CPU 700 which performs the processes described herein. The process data and instructions may be stored in memory 702. These processes and instructions may also be stored on a storage medium disk 704 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the controller 102 communicates, such as a server or computer.

Further, the claimed advancements may be provided as a utility application, background daemon, or component of an operating system, or combination thereof, executing in conjunction with CPU 700 and an operating system such as Microsoft Windows 7, UNIX, Solaris, LINUX, Apple MAC-OS and other systems known to those skilled in the art.

Figure 8:
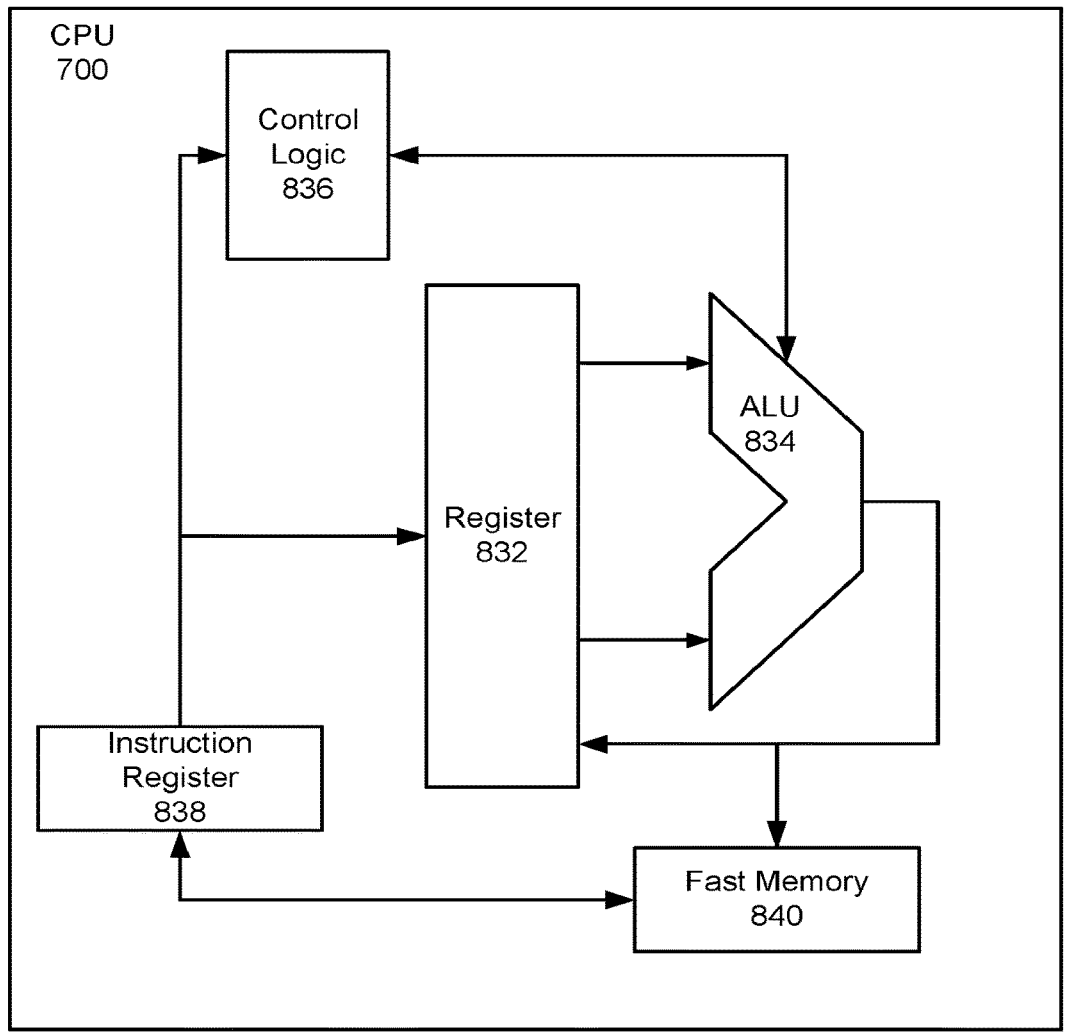
FIG. 8 is an exemplary block diagram of a central processing unit according to one example.

In order to achieve the controller 102, the hardware elements may be realized by various circuitry elements, known to those skilled in the art. For example, CPU 700 may be a Xenon or Core processor from Intel of America or an Opteron processor from AMID of America, or may be other processor types that would be recognized by one of ordinary skill in the art. Alternatively, the CPU 700 may be implemented on an FPGA, ASIC, PLD or using discrete logic circuits, as one of ordinary skill in the art would recognize. Further, CPU 700 may be implemented as multiple processors cooperatively working in parallel to perform the instructions of the inventive processes described above. For example, FIG. 8 shows one implementation of CPU 700.

The controller 102 in FIG. 7 also includes a network controller 706, such as an Intel Ethernet PRO network interface card from Intel Corporation of America, for interfacing with network 112. As can be appreciated, the network 112 can be a public network, such as the Internet, or a private network such as LAN or WAN network, or any combination thereof and can also include PSTN or ISDN sub-networks. The network 112 can also be wired, such as an Ethernet network, or can be wireless such as a cellular network including EDGE, 3G and 4G wireless cellular systems. The wireless network can also be WiFi, Bluetooth, or any other wireless form of communication that is known.

A general purpose I/O interface 708 interfaces with the output devices 106 as well as the input devices 108.

The general purpose storage controller 710 connects the storage medium disk 704 with communication bus 712, which may be an ISA, EISA, VESA, PCI, or similar, for interconnecting all of the components of the controller 102. A description of the general features and functionality of the storage controller 710, the network controller 706, and the general-purpose I/O interface 708 is omitted herein for brevity, as these features are known.

FIG. 8 is an exemplary block diagram of the CPU 700 according to one example.

In one implementation of CPU 700, the instruction register 838 retrieves instructions from the fast memory 840. At least part of these instructions are fetched from the instruction register 838 by the control logic 836 and interpreted according to the instruction set architecture of the CPU 700. Part of the instructions can also be directed to the register 832. In one implementation, the instructions are decoded according to a hardwired method, and in another implementation, the instructions are decoded according a microprogram that translates instructions into sets of CPU configuration signals that are applied sequentially over multiple clock pulses. After fetching and decoding the instructions, the instructions are executed using the arithmetic logic unit (ALU) 834 that loads values from the register 832 and performs logical and mathematical operations on the loaded values according to the instructions. The results from these operations can be feedback into the register and/or stored in the fast memory 840. According to certain implementations, the instruction set architecture of the CPU 700 can use a reduced instruction set architecture, a complex instruction set architecture, a vector processor architecture, a very large instruction word architecture. Furthermore, the CPU 700 can be based on the Von Neuman model or the Harvard model. The CPU 700 can be a digital signal processor, an FPGA, an ASIC, a PLA, a PLD, or a CPLD. Further, the CPU 700 can be an x86 processor by Intel or by AMD; an ARM processor, a Power architecture processor by, e.g., IBM; a SPARC architecture processor by Sun Microsystems or by Oracle; or other known CPU architecture.

The present disclosure is not limited to the specific circuit elements described herein, nor is the present disclosure limited to the specific sizing and classification of these elements.

The functions and features described herein may also be executed by various distributed components of a system. For example, one or more processors may execute these system functions, wherein the processors are distributed across multiple components communicating in a network.

The above-described hardware description is a non-limiting example of corresponding structure for performing the functionality described herein.

The hardware description above, exemplified by any one of the structure examples shown in FIG. 7, constitutes or includes specialized corresponding structure that is programmed or configured to perform the algorithms shown in FIGS. 5 and 6.

A system which includes the features in the foregoing description provides numerous advantages to users. In particular, drivers are trained on a vehicle before driving the vehicle. The drivers are trained on the alerts that may be generated in the vehicle. The drivers become familiar with the alerts thus reducing confusion when driving therefore increasing safety.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for providing training inside a vehicle, the method comprising:
   acquiring, using processing circuitry, one or more alert modes associated with advanced driver assistance systems of the vehicle, the advanced driver assistance systems including at least a driver attention system;
   accepting, using the processing circuitry, selection of a first alert mode via an input device of the vehicle, wherein the first alert mode is selected from the one or more alert modes;
   controlling, using the processing circuitry, one or more alert devices inside the vehicle as a function the first alert mode to simulate the first alert mode inside the vehicle; and
   outputting, using the processing circuitry, information to a user associated with the first alert mode via one or more output devices,
   wherein an intensity of an alert corresponding to the information is proportional to a priority level of the alert, and a highest priority level is assigned to an alert corresponding to a malfunction of an autonomous driving system of the vehicle.

2. The method of claim 1, wherein the one or more alert devices include at least one of a haptic device, a visual alert device, and an auditory alert device.

3. The method of claim 1, wherein the advanced driver assistance systems include at least one of a lane keep assist and warning system, a blind spot detection system, a forward crash warning system, a parking assist system, an automatic braking system, a lane change assist system, a rear cross traffic alert system, a pedestrian detection system, and an animal detection system.

4. The method of claim 1, further comprising:
determining an alert mode status associated with each of the one or more alert modes; and
updating a training status based on the alert mode status of each of the one or more alert modes.

5. The method of claim 4, further comprising:
serving the training status to an external device.

6. The method of claim 1, wherein the one or more output devices include at least one of a head up display and a multimedia head unit.

7. The method of claim 1, wherein the information is in an audible format.

8. The method of claim 1, wherein the information is in a visual format.

9. The method of claim 1, wherein the information associated with the first alert mode includes an explanation of a trigger of the first alert mode.

10. The method of claim 1, wherein controlling the one or more alert devices inside the vehicle includes controlling the one or more alert devices inside the vehicle to simulate the first alert mode inside the vehicle before the user drives the vehicle.

11. A system for providing training inside a vehicle, the system comprising:
one or more output devices;
advanced driver assistance systems including at least a driver attention system;
one or more alert devices inside the vehicle; and
processing circuitry configured to:
acquire one or more alert modes associated with the advanced driver assistance systems of the vehicle,
accept selection of a first alert mode via an input device of the vehicle, wherein the first alert mode is selected from the one or more alert modes;
control the one or more alert devices inside the vehicle as a function of the first alert mode to simulate the first alert mode inside the vehicle, and
output information to a user associated with the first alert mode via the one or more output devices,
wherein an intensity of an alert corresponding to the information is proportional to a priority level of the alert, and a highest priority level is assigned to an alert corresponding to a malfunction of an autonomous driving system of the vehicle.

12. The system of claim 11, wherein the one or more alert devices include at least one of a haptic device, a visual alert device, and an auditory alert device.

13. The system of claim 11, wherein the advanced driver assistance systems include at least one of a lane keep assist and warning system, a blind spot detection system, a forward crash warning system, a parking assist system, an automatic braking system, a lane change assist system, a rear cross traffic alert system, a pedestrian detection system, and an animal detection system.

14. The system of claim 11, wherein the processing circuitry is further configured to:
determine an alert mode status associated with each of the one or more alert modes; and
update a training status based on the alert mode status of each of the one or more alert modes.

15. The system of claim 14, wherein the processing circuitry is further configured to:
serve the training status to an external device.

16. The system of claim 11, wherein the one or more output devices include at least one of a head up display and a multimedia head unit.

17. The system of claim 11, wherein the processing circuitry is configured to control the one or more alert devices inside the vehicle to simulate the first alert mode inside the vehicle before the user drives the vehicle.

18. A non-transitory computer readable medium storing computer-readable instructions therein which when executed by a computer cause the computer to perform a method for providing training inside a vehicle, the method comprising:
acquiring one or more alert modes associated with advanced driver assistance systems of a vehicle, the advanced driver assistance systems including at least a driver attention system; accepting selection of a first alert mode via an input device of the vehicle, wherein the first alert mode is selected from the one or more alert modes;
controlling one or more alert devices inside the vehicle as a function of the first alert mode to simulate the first alert mode inside the vehicle; and
outputting information to a user associated with the first alert mode via one or more output devices,
wherein an intensity of an alert corresponding to the information is proportional to a priority level of the alert, and a highest priority level is assigned to an alert corresponding to a malfunction of an autonomous driving system of the vehicle.

* * * * *